US006907329B2

(12) United States Patent
Junger et al.

(10) Patent No.: US 6,907,329 B2
(45) Date of Patent: Jun. 14, 2005

(54) METHOD AND DEVICE FOR ACTIVATING AND/OR DEACTIVATING DISTRIBUTED CONTROL UNITS

(75) Inventors: Andreas Junger, Reutlingen (DE); Rainer Moritz, Filderstadt (DE); Uwe Lueders, Reutlingen (DE); Berthold Elbracht, Reutlingen (DE); Jens Haensel, Leonberg (DE); Wolfgang Kostorz, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 10/317,826

(22) Filed: Dec. 12, 2002

(65) Prior Publication Data

US 2003/0229402 A1 Dec. 11, 2003

(30) Foreign Application Priority Data

Dec. 14, 2001 (DE) .......................................... 101 61 669

(51) Int. Cl.$^7$ .............................................. G06F 17/00
(52) U.S. Cl. ............................... 701/36; 701/1; 701/29; 307/10.1
(58) Field of Search .............................. 701/1, 29, 33, 701/36, 96, 300, 301; 702/60–64; 713/321, 324; 367/99, 118–130; 307/10.1; 340/903, 435, 436, 438; 342/66, 69, 70

(56) References Cited

U.S. PATENT DOCUMENTS

| | | | | | |
|---|---|---|---|---|---|
| 5,521,579 | A | * | 5/1996 | Bernhard | 340/438 |
| 5,646,612 | A | * | 7/1997 | Byon | 340/903 |
| 5,654,715 | A | * | 8/1997 | Hayashikura et al. | 342/70 |
| 5,835,873 | A | * | 11/1998 | Darby et al. | 701/45 |
| 6,151,539 | A | * | 11/2000 | Bergholz et al. | 701/25 |
| 6,195,597 | B1 | * | 2/2001 | Yamada | 455/550.1 |
| 6,307,622 | B1 | * | 10/2001 | Lewis | 356/4.01 |
| 6,381,532 | B1 | * | 4/2002 | Bastian et al. | 701/114 |
| 6,448,671 | B1 | * | 9/2002 | Wallace et al. | 307/10.1 |
| 6,501,368 | B1 | * | 12/2002 | Wiebe et al. | 340/3.1 |
| 6,549,145 | B2 | * | 4/2003 | Hsu et al. | 340/905 |
| 6,553,297 | B2 | * | 4/2003 | Tashiro et al. | 701/48 |
| 6,728,603 | B2 | * | 4/2004 | Pruzan et al. | 701/1 |
| 2003/0120396 | A1 | * | 6/2003 | Vollmer et al. | 701/1 |

FOREIGN PATENT DOCUMENTS

DE 1 01 10 042 10/2002

* cited by examiner

Primary Examiner—Tan Q. Nguyen
(74) Attorney, Agent, or Firm—Kenyon & Kenyon

(57) ABSTRACT

A method and a device for activating and/or deactivating distributed control units is described, the microcomputer of a central control unit delivering corresponding activation or deactivation commands to the decentralized control units over an interface module as part of a point-to-point link.

11 Claims, 3 Drawing Sheets

METHOD AND DEVICE FOR ACTIVATING AND/OR DEACTIVATING DISTRIBUTED CONTROL UNITS

BACKGROUND INFORMATION

A distributed control system and/or analysis system in a motor vehicle is known from German Patent Application No. 1 01 10 042.6 of Mar. 2, 2001 (not a prior publication). In this system, decentralized control units (e.g., sensors having corresponding electronic units for control and/or analysis) are connected by a point-to-point link to a central control unit for data exchange. A data line leads from the central control unit to each decentralized control unit. Both the decentralized control units and the central control unit are designed for transmitting and receiving signals (data). The preferred application is based on the general field of environment sensors for motor vehicles, in particular radar sensor systems. The interface between the central control unit and decentralized control units is designed as a current-based dual wire interface. In the preferred embodiment, power is supplied from the central control unit to the distributed (decentralized) control units, resulting in a very high maximum power consumption.

SUMMARY OF THE INVENTION

It is especially advantageous that through appropriate control of the distributed (decentralized) control units, the latter are controlled in a state of reduced power consumption, at least in certain operating situations, so that the total power consumption of the distributed system is greatly reduced.

In an advantageous manner, the power-saving mode is activated by transmitting corresponding data from the central control unit to the selected decentralized units.

It is especially advantageous that this current management makes current peaks preventable and cost savings achievable, e.g., with regard to thermal management and power loss in input protection circuits and in the power supply to the decentralized control units and in the associated mechanical system.

Furthermore, more reliable operation of the decentralized system due to the standby/wake-up capability is also advantageous. In this way, the decentralized control system may have a continuous power supply (terminal 30). Furthermore, it is also possible to perform a system diagnosis with the ignition switched off.

In an especially advantageous manner, due to this measure, the power emitted into the environment is reduced significantly on the average when used in conjunction with a radar system for environment sensors in a motor vehicle. Furthermore, there is the possibility of reducing the mutual interference of the radar sensors because active sensors are selected and unneeded sensors are shut down, depending on the operating situation.

DETAILED DESCRIPTION

Figure 1:
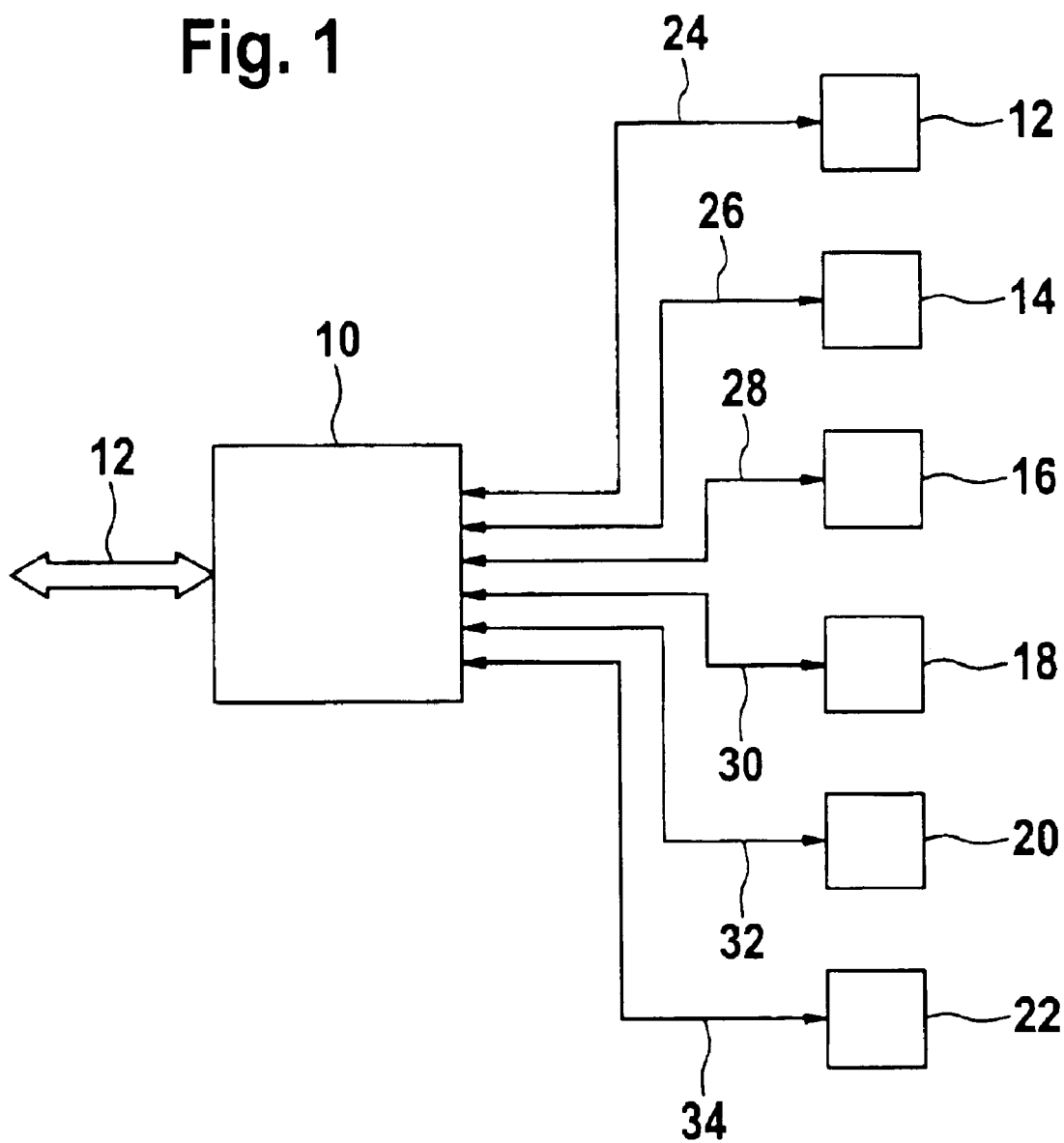
FIG. 1 shows a schematic diagram of a distributed system.

FIG. 1 shows a schematic diagram of a decentralized control system having a central control unit 10 which may be connected to other control units via a data communication system 12. In the example shown here, a total of six decentralized control units 12, 14, 16, 18, 20, 22 are connected to central control unit 10 as part of a point-to-point link. A bidirectional interface 24, 26, 28, 30, 32, 34 is provided between the central control unit and each decentralized control unit, in the preferred exemplary embodiment being a current-based dual wire interface. Data exchange takes place between the central control unit and the decentralized control units over the particular interface, the central control unit preferably transmitting data to and receiving data from the decentralized control units and each decentralized control unit transmitting data to or receiving data from the central control unit.

A preferred application is in the field of environment sensors for a motor vehicle, e.g., radar sensors, infrared or ultrasonic sensors, lasers and video cameras. These sensors and thus the decentralized control units are located on the outside of the vehicle, e.g., in the bumpers, on the vehicle side while the central control unit is mounted at a central location (e.g., in the interior). Thus, this is a system having distributed intelligent components (i.e., equipped with at least one processor). Depending on the application, more or fewer decentralized control units may be provided. In addition, however, the procedure described below may also be used with any other interface between two control units. The application is not limited to the field of environment sensing of motor vehicles but instead may also be used in other decentralized systems of motor vehicles, e.g., brake systems, engine control systems, etc., or in systems outside of motor vehicles.

Figure 2:
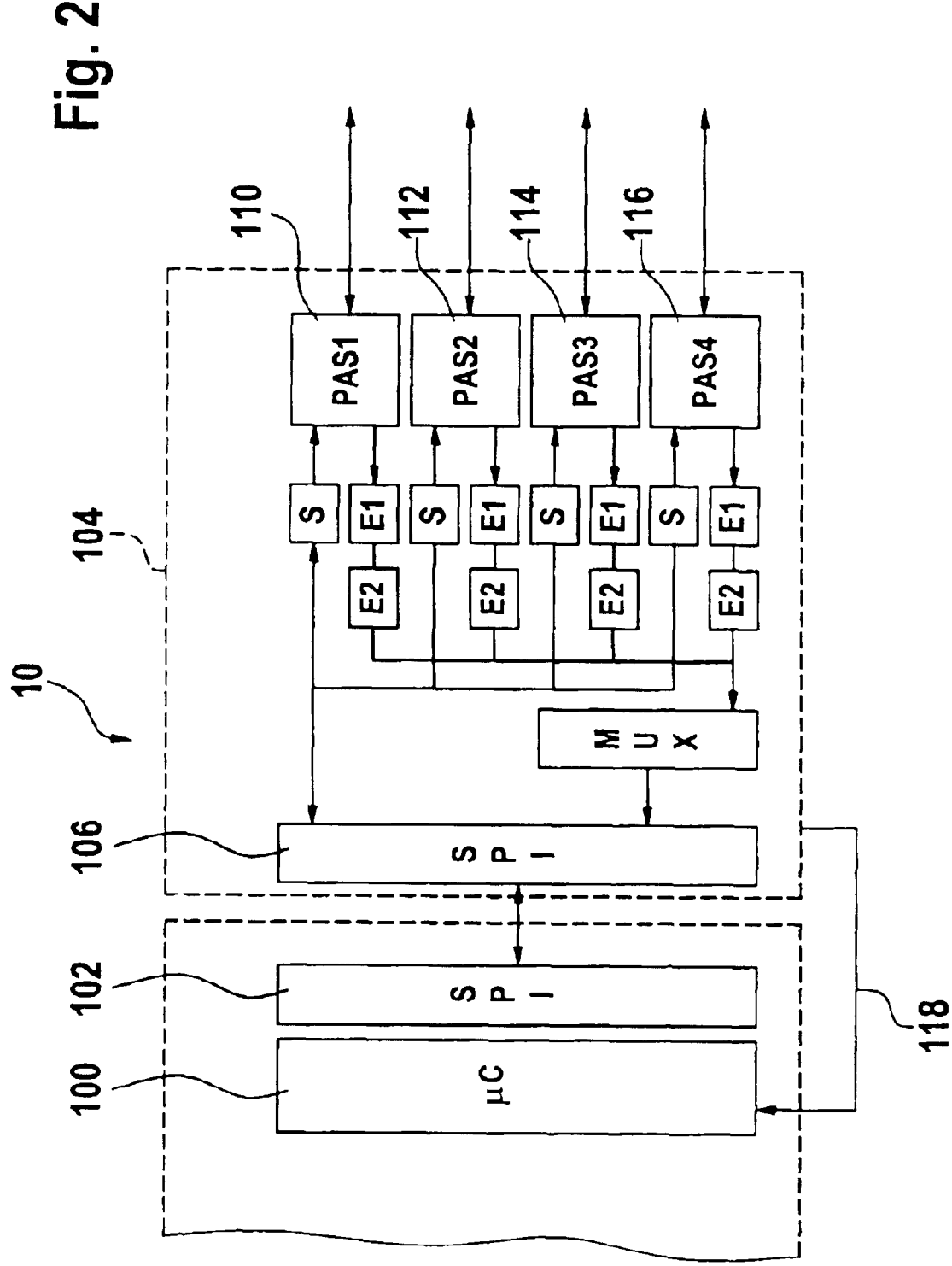
FIG. 2 shows a detailed embodiment of the central control unit.

FIG. 2 shows a detailed diagram of the interface-specific parts of central control unit 10 and a selected decentralized control unit 12. Furthermore, interfaces 26, 28, 30 to other decentralized control units are also indicated.

Central control unit 10 essentially includes a computer core and an interface module 102 (ASIC1). Preferably current-based dual wire interfaces to the decentralized control units are implemented. Computer core of central control unit 10 includes a computer and an Serial Peripheral Interface (SPI interface), which is connected via a data line to an SPI interface of interface module 102. For the transmit direction, interface module 102 has transmit memories, each of which is connected to current-based dual wire interface (PAS1 through PAS4). Data to be transmitted is delivered by microcomputer to module 102 via the SPI interface and is stored temporarily in the particular transmit memory, indicating whether the data is to be transmitted to all decentralized units, a group thereof or to an individual unit. The data is written into the memories accordingly. Then the stored data is transmitted from these memories via the particular interface to the decentralized control unit provided their reception memories are free. In the receive direction, data from a decentralized control unit is received by interface module 102 and stored in at least one receive memory E1, E2 (per receive channel). Then the received data is read out of this at least one memory by the computer via a multiplexer MUX and the SPI interface. To do so, the presence of data to be retrieved is signaled to the computer by the interface module over connecting line 1038.

The elements mentioned above are hardware elements whose implementation is essentially known. The size and number of memories is selected according to the application case. In one application example, a transmit memory having a length of one byte has proven suitable. It should be pointed out that the SPI interface and/or the PAS interface has its/their own buffer memories in one embodiment.

The sequence in module 102 described below is hardwired in the module. In the preferred exemplary embodiment, interface module 104 is an ASIC.

The system shown here allows microcomputer 100 to transmit data to all or individual selected decentralized control units by transmitting data over the SPI interface to interface module 104, in particular through an appropriate command. In the preferred embodiment, the decentralized control units are supplied with power via the central control unit. In a preferred application case, it has been found that the power consumption per decentralized control unit (radar sensor) is 300 mA, and a maximum of 12 sensors are connected to one central control unit. This yields a maximum sensor-induced power consumption of 3.6 A, i.e., a relatively high value. It is therefore provided that one or more sensors, depending on the operating state of the vehicle, be brought into an operating state having minimal power consumption by the central control unit via the interface. In this operating state, the active functions of the decentralized control unit (in the case of a radar sensor, the transmitting and receiving functions of the radar signal in particular) are shut down while the basic operation of the interface, in particular its readiness to receive, is maintained. This makes it possible to greatly reduce power consumption. Examples of such operating situations in which at least some of the decentralized control units may be shut down include driving at a high speed at which lateral radar sensors need not be active or driving in forward gear, when rear radar sensors might not need to be active, etc. Other operating states include the vehicle standing still, a maintenance procedure, etc.

Thus, if the currently active function of one or more decentralized control units is not needed during driving operation or at a standstill or during maintenance work, then a data set ordering the particular decentralized control unit to shut down and wait for a wake-up command is sent via an SPI command from the microcomputer of the central control unit over the interfaces leading to the selected decentralized control units. In a preferred embodiment, the command is composed of the data itself, the selected control units being encoded by a suitable identifier. Either all or a predetermined selection of the decentralized control units may be switched by the microcomputer to a power-saving mode. If the function of the control system again requires an active decentralized control unit, which is currently in an off state, however, then a corresponding command of the microcomputer of the central control unit and/or a corresponding data set is relayed via the corresponding interface to the decentralized control unit, ordering it to turn on again (wake-up command).

Figure 3:
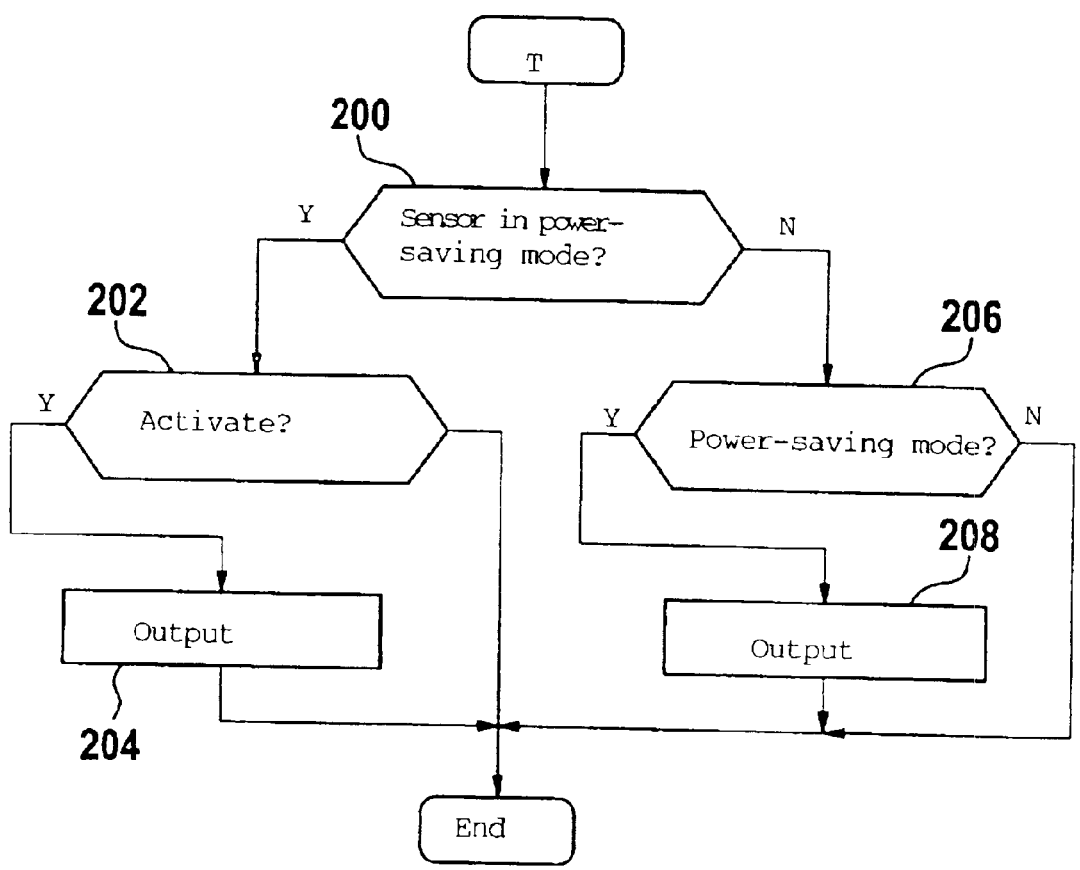
FIG. 3 illustrates the implementation of the activation and/or deactivation of the decentralized control units and/or selected decentralized control units on the basis of a simplified flow chart.

FIG. 3 shows a flow chart illustrating the sequence in conjunction with activation and deactivation of all or individual decentralized control units. The simplified flow chart represents a program running in the microcomputer of the central control unit. A similar program is run through for each decentralized control unit or a group of control units at certain points in time. First a check is performed in step 200 to ascertain whether the control unit is currently in a power-saving mode. If this is the case, then step 202 determines whether the prevailing operating state is one in which the sensor is to be activated. If this is the case, a corresponding command or data set is output by the microcomputer via the Serial Peripheral Interface (SPI interface) and the current-based interface to the corresponding decentralized control unit in step 204, so that reactivation of the decentralized control unit is triggered. If the control unit is not to be activated, there is no action.

If the corresponding control unit is not in power-saving mode, then a check is performed in step 206 to determine whether the prevailing operating state is one in which the decentralized control unit may be switched to power-saving mode. If this is the case, then according to step 208 a corresponding command or data set is output as explained above. Otherwise there is no action.

In other application examples, a corresponding program is not implemented for individual sensors but instead for a group of sensors (e.g., left sensors, right sensors, forward sensors, rear sensors).

The procedure described here is applicable not only in conjunction with systems for environment sensing of a motor vehicle but also in other decentralized systems in which individual decentralized control units are switchable to a power-saving mode.

The power-saving mode is implemented so that the parts essential to the central control unit are disconnected from the power supply while their reception readiness via the current-based interface is maintained, i.e., there is still a power connection from the central unit to the decentralized unit.

What is claimed is:

1. A method of at least one of activating and deactivating distributed control units, comprising:

providing point-to-point wiring between a central control unit and decentralized control units;

transmitting a corresponding signal from the central control unit to a corresponding decentralized control unit via an interface, the signal being one of an activation signal and a deactivation signal; and prompting, by the central control unit, at least one of an activation and a deactivation of selected ones of the decentralized control units via one of a command and a data set;

wherein the decentralized control units are controlled in a state of reduced power consumption.

2. The method according to claim 1, wherein the activation/deactivation command is valid for one of: (a) individual ones of the decentralized control units, (b) a predetermined group of the decentralized control units, and (c) all of the decentralized control units.

3. The method according to claim 1, wherein the decentralized control units control sensors for environment sensing of a motor vehicle, deactivation of individual ones of the sensors being performed in predetermined operating states of the vehicle.

4. The method according to claim 3, wherein the predetermined operating states include a state of one of: (a) high speed, (b) vehicle standstill, and (c) vehicle maintenance.

5. The method according to claim 1, wherein the at least one of the activation and deactivation is prompted by a microcomputer of the central control unit via an SPI interface and a current-based dual wire interface.

6. The method according to claim 1, wherein the state of reduced power consumption prevents current peaks in a power supply to the decentralized control units.

7. The method according to claim 1, wherein the decentralized control units have a continuous power supply via a standby/wake-up capability.

8. A device for at least one of activating and deactivating distributed control units, comprising:

a central control unit;

decentralized control units;

a point-to-point interface linking the central control unit to the decentralized control units;

a microcomputer generating a command for one of activation and deactivation and transmitting the command to the decentralized control units; and an interface module receiving the command of the microcomputer via an interface and delivering the command via another interface to selected ones of the decentralized control units;

wherein the decentralized control units are controlled in a state of reduced power consumption.

9. The device according to claim 8, wherein the decentralized control units are for sensors for sensing an environment of a motor vehicle.

10. The device according to claim 9, wherein the sensors are radar sensors.

11. The device according to claim 10, wherein interference between the radar sensors is reduced via selecting active sensors and shutting down unneeded sensors.

* * * * *